US008246265B2

(12) United States Patent
Hayes et al.

(10) Patent No.: US 8,246,265 B2
(45) **Date of Patent: *Aug. 21, 2012**

(54) VALVE MADE FROM TWO MATERIALS AND WRITING UTENSIL WITH RETRACTABLE TIP INCORPORATING SAME

(75) Inventors: Christopher John Hayes, Orland Park, IL (US); Andrew Bielecki, Evanston, IL (US); Jaime Arenas, Lombard, IL (US)

(73) Assignee: Sanford, L.P., Oak Brook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/968,265

(22) Filed: Dec. 14, 2010

(65) Prior Publication Data

US 2011/0084225 A1 Apr. 14, 2011

Related U.S. Application Data

(63) Continuation of application No. 11/654,959, filed on Jan. 18, 2007, now Pat. No. 7,850,382.

(51) Int. Cl.
*B43K 5/16* (2006.01)
*F16K 31/00* (2006.01)

(52) U.S. Cl. ......... 401/108; 401/107; 251/298; 251/228

(58) Field of Classification Search .................... 401/99, 401/107, 108; 251/368, 299–301, 298, 212, 251/228, 231, 235
See application file for complete search history.

(56) References Cited

U.S. PATENT DOCUMENTS 1,810,249 A 6/1931 Koehler
1,940,548 A 12/1933 Jensen
2,291,859 A 8/1942 Andrews
2,392,840 A 1/1946 Groft
2,401,711 A 6/1946 Smith
2,603,186 A 7/1952 Fischer
2,626,049 A 1/1953 Tursky (Continued)

FOREIGN PATENT DOCUMENTS

DE 34 38 074 4/1986

(Continued)

OTHER PUBLICATIONS

International Search Report for PCT/US2008/050998, Jan. 18, 2007.

(Continued)

*Primary Examiner* — David Walczak

(74) *Attorney, Agent, or Firm* — Marshall, Gerstein & Borun LLP

(57) ABSTRACT

A valve includes a first valve portion made from a first material, the first valve portion including a body, a door, and an inner hinge pivotably connecting the body to the door, the body including a first opening at a first end and a second opening at a second end opposite the first end, and a circumferential recess disposed in the second end, wherein the inner hinge pivotably connects the door to the body at the first end and a second valve portion made from a second material, the second valve portion including an inner seal disposed in the circumferential recess, the inner seal including a circumferential ridge extending inwardly, the second valve portion further including a door seal disposed on the first end of the body.

18 Claims, 4 Drawing Sheets

U.S. PATENT DOCUMENTS 2,874,679 A 2/1959 Zepelovitch
2,908,286 A * 10/1959 Hallstrom .................... 137/522
2,949,887 A 8/1960 Martin et al.
2,957,452 A 10/1960 Brannon
3,035,299 A 5/1962 Gordon et al.
3,124,106 A 3/1964 Kosta
3,169,511 A 2/1965 Spatz
3,480,370 A 11/1969 Koeln
3,525,573 A 8/1970 Fend
3,583,820 A 6/1971 Koeln
3,594,091 A 7/1971 Bleuer
3,617,138 A 11/1971 Fukui et al.
3,637,316 A 1/1972 Bross et al.
3,733,139 A 5/1973 Neidhardt et al.
3,895,632 A 7/1975 Plowiecki et al.
3,944,371 A 3/1976 Schenk
3,945,734 A 3/1976 Woodbridge
3,955,893 A 5/1976 Pulaski
4,115,015 A 9/1978 Torii et al.
4,161,374 A 7/1979 Koeln et al.
4,177,814 A 12/1979 Knepshield et al.
4,218,154 A 8/1980 Erfer
4,269,525 A 5/1981 Melikian
4,318,340 A 3/1982 Shenoha et al.
4,469,462 A 9/1984 Hashimoto et al.
4,479,732 A 10/1984 Shimizu et al.
4,540,300 A 9/1985 Midorikawa et al.
4,560,297 A 12/1985 Leem et al.
4,575,271 A 3/1986 Hashimoto et al.
4,580,918 A 4/1986 Baker et al.
4,618,280 A 10/1986 Kageyama et al.
4,629,348 A 12/1986 Hashimoto et al.
4,711,592 A 12/1987 Gregory
4,738,724 A 4/1988 Wittwer et al.
4,738,817 A 4/1988 Wittwer et al.
4,768,529 A 9/1988 Mahruki et al.
4,812,299 A 3/1989 Wason
4,859,103 A 8/1989 Wittek et al.
4,863,796 A 9/1989 Wason
4,879,058 A 11/1989 Wason
4,879,323 A 11/1989 Wason
4,896,983 A 1/1990 Im et al.
4,902,657 A 2/1990 Wason
4,902,729 A 2/1990 Wason
4,911,570 A 3/1990 Rhoades
4,933,387 A 6/1990 Wason
4,937,078 A 6/1990 Mezei et al.
4,954,468 A 9/1990 Wason
4,968,728 A 11/1990 Wason
4,969,764 A 11/1990 Gregory
4,974,980 A 12/1990 Gueret et al.
5,022,773 A 6/1991 Waldinger et al.
5,026,189 A 6/1991 Keil et al.
5,090,955 A 2/1992 Simon
5,092,701 A 3/1992 Lai et al.
5,257,647 A * 11/1993 Wilhite .......................... 239/25
5,336,006 A 8/1994 Badr et al.
5,342,136 A 8/1994 Fukami et al.
5,358,864 A 10/1994 van den Broeck et al.
5,372,580 A 12/1994 Simon et al.
5,420,615 A 5/1995 Witz et al.
5,426,456 A 6/1995 Kuelzer et al.
5,439,626 A 8/1995 Bennett et al.
5,454,655 A 10/1995 Chiswell
5,517,218 A 5/1996 Lehna et al.
5,547,301 A 8/1996 Kageyama et al.
5,547,468 A 8/1996 Simon et al.
5,553,956 A 9/1996 Mitsuya et al.
5,604,036 A 2/1997 Price et al.
5,605,402 A 2/1997 Uggetti et al.
5,607,437 A 3/1997 Simon et al.
5,610,046 A 3/1997 van Ooyen et al.
5,643,660 A 7/1997 Price et al.
5,651,627 A 7/1997 Dowzall et al.
5,653,725 A 8/1997 Simon et al.
5,672,021 A 9/1997 Abber et al.
5,676,481 A 10/1997 Nicoll et al.
5,813,787 A 9/1998 Dowzall et al.
5,823,697 A 10/1998 Talbot et al.
5,829,904 A 11/1998 Matsumoto et al.
5,849,559 A 12/1998 Van Der Wouw et al.
5,865,553 A 2/1999 Flye Sainte Marie et al.
5,871,296 A 2/1999 Furukawa et al.
5,891,398 A 4/1999 Lewis et al.
5,899,618 A 5/1999 Kobayashi et al.
5,906,446 A 5/1999 McCulloch et al.
5,927,882 A 7/1999 Kageyama et al.
5,927,883 A 7/1999 Lebauer
5,929,051 A 7/1999 Ni et al.
5,931,846 A 8/1999 Simon et al.
5,961,703 A 10/1999 Fraas et al.
5,967,688 A 10/1999 Hu et al.
6,027,271 A 2/2000 Barosso et al.
6,066,356 A 5/2000 Van Der Wouw et al.
6,089,776 A 7/2000 Kaufmann et al.
6,095,707 A 8/2000 Kaufmann et al.
6,099,924 A 8/2000 Nakamaki et al.
6,120,751 A 9/2000 Unger
6,135,660 A 10/2000 Stevens et al.
6,155,733 A 12/2000 Holbrook et al.
6,158,913 A 12/2000 Dumler et al.
6,170,318 B1 1/2001 Lewis
6,213,661 B1 4/2001 Coon
6,231,257 B1 5/2001 Stevens et al.
6,244,744 B1 6/2001 Calvin
6,244,774 B1 6/2001 Barosso et al.
6,261,019 B1 7/2001 Furukawa et al.
6,306,598 B1 10/2001 Charych et al.
6,350,369 B1 2/2002 Lewis et al.
6,409,408 B2 6/2002 Koyama et al.
6,416,242 B1 7/2002 Kaufmann et al.
6,417,121 B1 7/2002 Newkirk et al.
6,417,122 B1 7/2002 Newkirk et al.
6,420,285 B1 7/2002 Newkirk et al.
6,433,012 B1 8/2002 Tuse et al.
6,468,759 B1 10/2002 Charych
6,482,517 B1 11/2002 Anderson
6,561,713 B2 5/2003 Sukhna et al.
6,565,763 B1 5/2003 Asakawa et al.
6,605,344 B1 8/2003 Ohba et al.
6,607,325 B2 8/2003 Hori et al.
6,631,333 B1 10/2003 Lewis et al.
6,638,621 B2 10/2003 Anderson
6,644,880 B2 11/2003 Duez et al.
6,648,539 B2 11/2003 Dai et al.
6,656,319 B1 12/2003 Boyd et al.
6,723,394 B1 4/2004 Sirringhaus et al.
6,752,557 B1 6/2004 Hsieh et al.
6,927,256 B2 8/2005 Stevens et al.
6,964,534 B2 11/2005 Brand et al.
6,967,102 B1 11/2005 Anderson et al.
6,974,697 B2 12/2005 Comer et al.
6,977,244 B2 12/2005 Tormo et al.
6,979,456 B1 12/2005 Parikh et al.
6,979,558 B2 12/2005 Harris, Jr. et al.
6,979,559 B2 12/2005 Harris, Jr. et al.
6,981,812 B1 1/2006 Hsieh et al.
6,989,007 B2 1/2006 Shadduck
6,989,195 B2 1/2006 Anderson
6,991,514 B1 1/2006 Meloni et al.
7,004,945 B2 2/2006 Boyd et al.
7,008,633 B2 3/2006 Yang et al.
7,018,838 B2 3/2006 Murphy et al.
7,022,683 B1 4/2006 Ni et al.
7,037,015 B1 5/2006 Witz et al.
7,037,657 B2 5/2006 Le et al.
7,048,963 B2 5/2006 Braithwaite et al.
7,059,796 B2 6/2006 Lewis, Jr. et al.
7,060,754 B2 6/2006 Stevens et al.
7,101,102 B2 9/2006 Sawa et al.
7,329,062 B2 2/2008 Brand et al.
7,350,996 B2 4/2008 Bielecki et al.
2002/0010510 A1 1/2002 Silvestrini
2002/0029084 A1 3/2002 Paul et al.
2002/0081139 A1 6/2002 Legg
2002/0081232 A1 6/2002 Lewis et al.
2002/0131807 A1 9/2002 Ami et al.

| | | | |
|---|---|---|---|
| 2002/0142477 | A1 | 10/2002 | Lewis et al. |
| 2002/0172544 | A1 | 11/2002 | Dai |
| 2002/0192007 | A1 | 12/2002 | Lee |
| 2003/0068191 | A1 | 4/2003 | Hori |
| 2003/0108377 | A1 | 6/2003 | Duez et al. |
| 2003/0108743 | A1 | 6/2003 | Anderson |
| 2003/0195300 | A1 | 10/2003 | Stevens et al. |
| 2003/0211130 | A1 | 11/2003 | Sanders et al. |
| 2003/0215281 | A1 | 11/2003 | Sexton et al. |
| 2003/0222048 | A1 | 12/2003 | Asakawa et al. |
| 2004/0028875 | A1 | 2/2004 | Van Rijn et al. |
| 2004/0050816 | A1 | 3/2004 | Asakawa et al. |
| 2004/0062879 | A1 | 4/2004 | Bowman et al. |
| 2004/0201117 | A1 | 10/2004 | Anderson |
| 2004/0265035 | A1 | 12/2004 | Brand et al. |
| 2005/0004578 | A1 | 1/2005 | Lambrecht et al. |
| 2005/0019112 | A1 | 1/2005 | Erickson et al. |
| 2005/0043470 | A1 | 2/2005 | Stevens et al. |
| 2005/0047844 | A1 | 3/2005 | Lammers et al. |
| 2005/0074268 | A1 | 4/2005 | Beil |
| 2005/0084320 | A1 | 4/2005 | Carroll |
| 2005/0084321 | A1 | 4/2005 | Carroll |
| 2005/0089656 | A1 | 4/2005 | Shiina |
| 2005/0115690 | A1 | 6/2005 | Bohlig |
| 2005/0191112 | A1 | 9/2005 | Yoon |
| 2005/0196580 | A1 | 9/2005 | Provost et al. |
| 2005/0196583 | A1 | 9/2005 | Provost et al. |
| 2005/0208259 | A1 | 9/2005 | Provost et al. |
| 2005/0217092 | A1 | 10/2005 | Barker et al. |
| 2005/0221271 | A1 | 10/2005 | Murphy et al. |
| 2005/0246023 | A1 | 11/2005 | Yeung |
| 2005/0250181 | A1 | 11/2005 | Schroder Glad et al. |
| 2005/0256253 | A1 | 11/2005 | Parker et al. |
| 2005/0265774 | A1 | 12/2005 | Albisetti |
| 2005/0271451 | A1 | 12/2005 | Brand et al. |
| 2006/0002755 | A1 | 1/2006 | Sawa |
| 2006/0002852 | A1 | 1/2006 | Saltzman et al. |
| 2006/0002971 | A1 | 1/2006 | Saltzman et al. |
| 2006/0004193 | A1 | 1/2006 | Muller et al. |
| 2006/0004314 | A1 | 1/2006 | McCarthy et al. |
| 2006/0019339 | A1 | 1/2006 | Lauth et al. |
| 2006/0036269 | A1 | 2/2006 | Schachar et al. |
| 2006/0051274 | A1 | 3/2006 | Wright et al. |
| 2006/0051451 | A1 | 3/2006 | Hutchinson et al. |
| 2006/0051735 | A1 | 3/2006 | Fuhr et al. |
| 2006/0058383 | A1 | 3/2006 | Huang et al. |
| 2006/0062780 | A1 | 3/2006 | Zocher et al. |
| 2006/0063882 | A1 | 3/2006 | Velev et al. |
| 2006/0065992 | A1 | 3/2006 | Hutchinson et al. |
| 2006/0069230 | A1 | 3/2006 | Papisov |
| 2006/0073159 | A1 | 4/2006 | Vonderheide et al. |
| 2006/0073294 | A1 | 4/2006 | Hutchinson et al. |
| 2006/0073298 | A1 | 4/2006 | Hutchinson et al. |
| 2006/0073333 | A1 | 4/2006 | Anderson |
| 2006/0084034 | A1 | 4/2006 | Hochman |
| 2006/0088897 | A1 | 4/2006 | Lim et al. |
| 2006/0095066 | A1 | 5/2006 | Chang et al. |
| 2006/0099244 | A1 | 5/2006 | Guilford |
| 2006/0106408 | A1 | 5/2006 | Schachar et al. |
| 2006/0106409 | A1 | 5/2006 | Schachar et al. |
| 2006/0110439 | A1 | 5/2006 | Tobia et al. |
| 2006/0115462 | A1 | 6/2006 | Subbotin et al. |
| 2006/0116712 | A1 | 6/2006 | Sepetka et al. |
| 2006/0116713 | A1 | 6/2006 | Sepetka et al. |
| 2006/0121608 | A1 | 6/2006 | Comer et al. |

FOREIGN PATENT DOCUMENTS

| | | |
|---|---|---|
| EP | 0 150 557 | 8/1985 |
| EP | 0 267 557 | 5/1988 |
| EP | 0 316 007 | 5/1989 |
| EP | 0 354 823 | 2/1990 |
| EP | 0 400 272 | 12/1990 |
| EP | 0 469 465 | 2/1992 |
| EP | 0 545 917 | 6/1993 |
| EP | 0 586 792 | 3/1994 |
| EP | 0 667 818 | 8/1995 |
| EP | 0 703 096 | 3/1996 |
| EP | 0 711 673 | 5/1996 |
| EP | 0 822 098 | 2/1998 |
| EP | 0 899 128 | 3/1999 |
| EP | 1 050 417 | 11/2000 |
| EP | 1 600 078 | 11/2005 |
| GB | 243110 | 11/1925 |
| GB | 937632 | 9/1963 |
| JP | 58-009788 | 1/1983 |
| JP | 60-119588 | 6/1985 |
| JP | 1-280596 | 11/1989 |
| JP | 1-281999 | 11/1989 |
| JP | 2-108086 | 4/1990 |
| JP | 2-283499 | 11/1990 |
| JP | 4-043345 | 2/1992 |
| JP | 4-316899 | 11/1992 |
| JP | 6-035232 | 2/1994 |
| JP | 6-216585 | 8/1994 |
| JP | 7-242094 | 9/1995 |
| JP | 7-290883 | 11/1995 |
| JP | 7-329486 | 12/1995 |
| JP | 8-072470 | 3/1996 |
| JP | 8-108676 | 4/1996 |
| JP | 8-216585 | 8/1996 |
| JP | 8-258480 | 10/1996 |
| JP | 8-282174 | 10/1996 |
| JP | 8-282175 | 10/1996 |
| JP | 9-131994 | 5/1997 |
| JP | 10-100579 | 4/1998 |
| JP | 2003-128971 | 5/2003 |
| WO | WO-93/12175 | 6/1993 |
| WO | WO-93/17879 | 9/1993 |
| WO | WO-94/11204 | 5/1994 |
| WO | WO-94/11205 | 5/1994 |
| WO | WO-94/25293 | 11/1994 |
| WO | WO-95/07191 | 3/1995 |
| WO | WO-96/39054 | 12/1996 |
| WO | WO-98/06450 | 2/1998 |
| WO | WO-99/11471 | 3/1999 |
| WO | WO-01/28696 | 4/2001 |
| WO | WO-01/64453 | 9/2001 |
| WO | WO-02/06437 | 1/2002 |
| WO | WO-02/13173 | 2/2002 |
| WO | WO-02/064379 | 8/2002 |
| WO | WO-2005/009755 | 2/2005 |

OTHER PUBLICATIONS

Chinese Office Action dated Dec. 16, 2010, for Chinese Patent Application No. 200880002149.6.

Examination Report for GB 0909271.9, dated Jan. 4, 2011.

* cited by examiner

VALVE MADE FROM TWO MATERIALS AND WRITING UTENSIL WITH RETRACTABLE TIP INCORPORATING SAME

CROSS-REFERENCE TO RELATED APPLICATION

This is a continuation of U.S. patent application Ser. No. 11/654,959 (now U.S. Pat. No. 7,850,382), filed Jan. 18, 2007, the entire respective disclosure of which is incorporated by reference in its entirety.

FIELD OF THE INVENTION

The present disclosure relates generally to a writing utensil with a writing tip that may be retracted into the body, and more particularly to a valve that stores the writing tip when the tip is retracted into the body.

BACKGROUND OF THE INVENTION

Various known writing utensils have a fibrous writing tip, or nib, and a reservoir filled with liquid ink in communication with the nib. In general, these writing utensils, e.g., markers and pens, include a separate cap that releasably attaches to the body of the writing utensil to cover and seal the nib in a substantially air-tight manner. In this way, the liquid ink disposed in the nib and the reservoir does not evaporate, and the writing utensil does not dry out. While the cap is successful in keeping a tight seal over the nib and keeping the writing utensil functional, the writing utensil will inevitably dry out and be ruined if the cap is lost.

To address this issue, the so-called "cap-less" maker has been devised. In certain cap-less markers, the nib is retractable from an extended writing position, in which the user can write with the marker, to a retracted or withdrawn position, in which the nib is stored in a valve. The valve generally includes a valve door which substantially seals the nib inside the valve when the marker is in the retracted position. The valve door opens up to allow the nib to extend out of the body of the marker into the writing position so the user can write with the marker.

U.S. Pat. No. 5,048,990 to Hashimoto describes a cap-less marker that has been successfully commercialized. In the commercialized version of this marker, the nib is a large fiber-type tip, and the valve is made entirely from a thermoplastic elastomer, also known as TPE. While a TPE valve can generally provide a good seal between the valve body and the valve door, many TPE's have poor vapor barrier properties. Thus, solvent vapor from the ink is likely to permeate through the walls of the valve so as to dry out the nib/tip. Further, all-TPE valves may exhibit poor structural integrity over time. For example, the commercialized Hashimoto valve is subject to loading applied by a spring and a string when the writing tip/nib is in the retracted (or sealed) position. Over time, the TPE material begins to creep and the valve deforms. This deformation can inhibit the valve's ability to maintain an air-tight seal between the valve body and the valve door.

In the case of a marker including a (relatively) large, fibrous nib, a valve made from TPE generally works adequately. In such markers, the large nib retains a large volume of ink and has a relatively large wick portion in fluid communication with an ink reservoir. The wick portion includes many capillary channels, which allows a large volume of ink to travel from the reservoir to the writing tip. Thus, the nib can generally replenish any ink within the nib/tip that evaporates so that the nib does not dry out, and the writing utensil is not ruined. However, consumers are demanding permanent markers with an ultra-fine tip, instead of a large fiber-type tip, for everyday writing. Such a marker has a much smaller nib/tip made from an extruded plastic, includes very small capillary channels, and has a smaller wick portion in fluid communication with an ink reservoir.

An all-TPE valve is generally not satisfactory for an ultra-fine tip due to ink vapor permeating through the valve walls. An ultra-fine tip has very small capillary channels where very little ink is present. Because only a small amount of ink permeation or evaporation will clog the tip, this construction is vulnerable to 'hard starting,' and susceptible to complete dry-out. Hard start means the marker struggles to write initially with little or no ink being deposited on the paper. Consequently, dry-out is of greater concern for such ultra-fine markers (relative to markers including a large, fibrous nib/tip).

Figure 1:
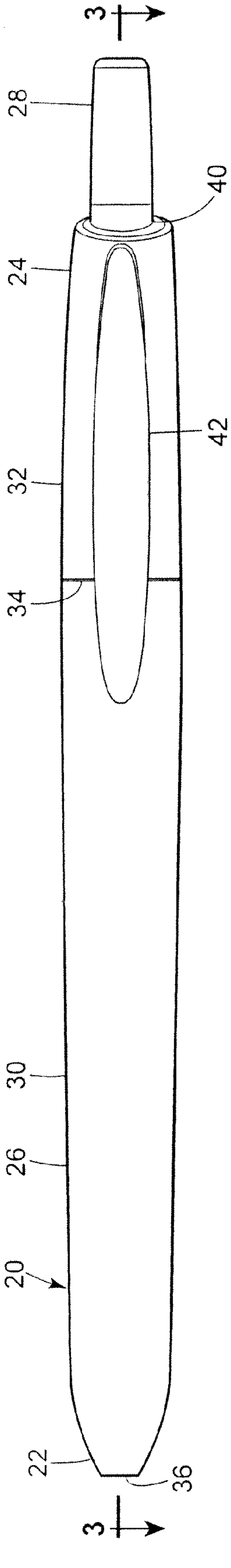
FIG. 1 is a side view of a retractable marker with the tip in a retracted position.

While the devices and methods described herein are susceptible to various modifications and alternative constructions, certain illustrative embodiments have been shown in the drawings and will be described below in detail. It should be understood, however, that there is no intention to limit the invention to the specific forms disclosed. On the contrary, the intention is to cover all modifications, alternative constructions, and equivalents falling within the spirit and scope of the disclosure.

DETAILED DESCRIPTION

Figure 2:
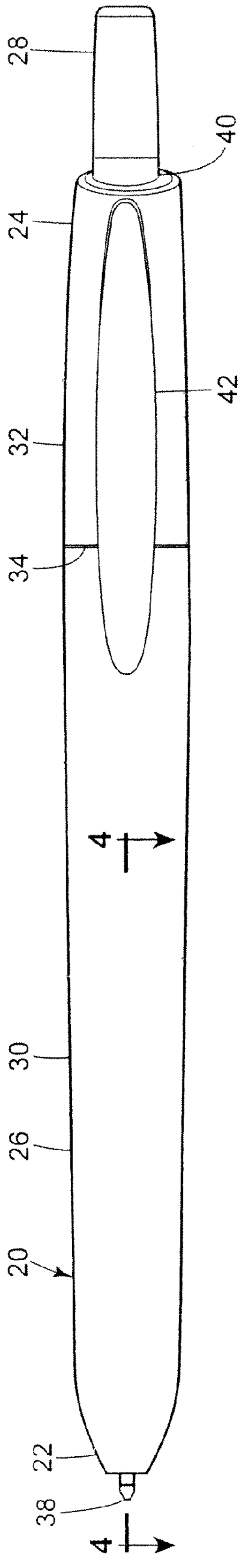
FIG. 2 is a side view of the retractable maker of FIG. 1 with the tip in a writing position.

Referring now to FIGS. 1 and 2 of the drawings, a marker 20 with a writing end 22 and an actuation end 24 is shown. The marker 20 includes a body 26 and an actuator 28. As shown, the body 26 includes a front holder 30 and a rear holder 32 that can be secured or snap fit together at a joint 34. In other embodiments, the front holder 30 and the rear holder 32 can be threadably engaged at the joint 34. The front holder 30 includes an opening 36 at the writing end 22 through which a writing tip 38 can extend and retract between a retracted position as shown in FIG. 1 and a writing position as shown in FIG. 2. The actuator 28 is disposed through a rear opening 40 in the actuation end 24 of the rear holder 32, and the user can depress and release the actuator 28 to alternate the marker 20 between the writing position and the retracted position. The rear holder 32 may also advantageously include a clip 42 for securing the marker 20 to an article such as a shirt pocket, a notebook, or the like.

Figure 3:
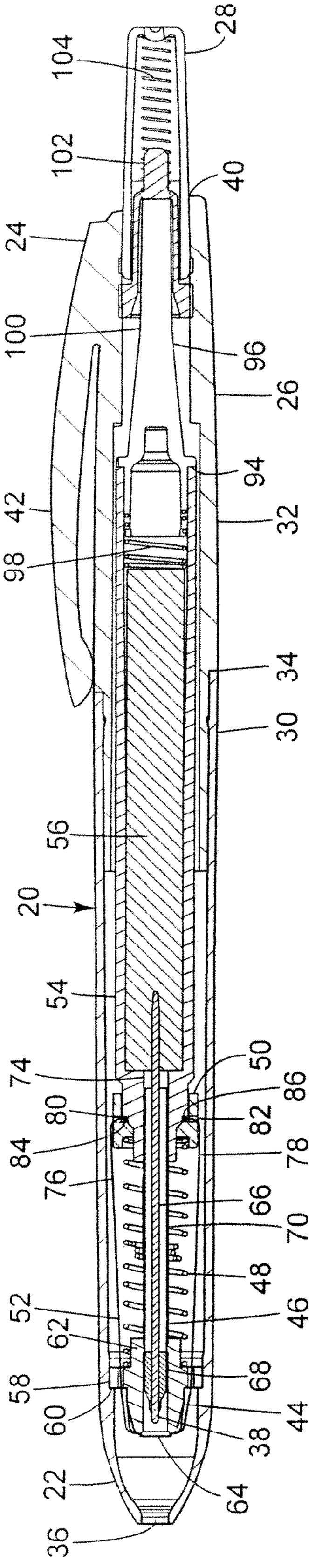
FIG. 3 is a cross-sectional view of the retractable maker of FIG. 1, taken along line 3-3 in FIG. 1, with the marker in the retracted position.
Figure 4:
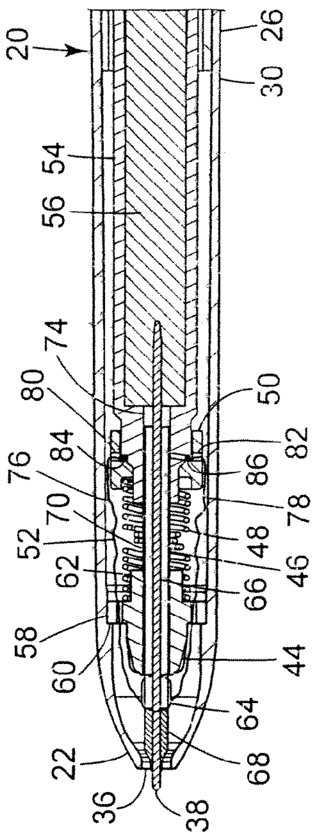
FIG. 4 is a cross-sectional view of the writing end of the retractable marker of FIG. 1, taken along line 4-4 in FIG. 2, with the marker in the writing position.

Referring now to FIGS. 3 and 4, across sectional view of the marker 20 is shown. FIG. 3 depicts the retracted position, while FIG. 4 depicts the writing position. Disposed within the body 26 are a valve 44, a nib subassembly 46, a spring 48, a collar 50, a string 52, a reservoir holder 54, and a reservoir 56. The valve 44 includes a flange 58, and the front holder 30 includes an internal shoulder 60. The flange 58 bears against the internal shoulder 60 and the valve 44 may be press fit or adhesively fixed to the front holder 30 to couple the valve 44 to the front holder 30. The valve 44 includes a valve body 62 and a door 64 that is shiftable from a closed position shown in FIG. 3 to an open position shown in FIG. 4.

The nib subassembly 46 includes a nib 66, a metal nib adapter 68, and a nib tube 70 surrounding the nib 66. The nib 66 extends from the writing tip 38 back through a hole 74 in the reservoir holder 54 such that it is disposed within the reservoir 56 to permit transport of ink stored in the reservoir 56 to the writing tip 38. The reservoir 56 in this example is a conventional capillary reservoir. A free ink reservoir with a capillary buffer to store the excess ink could also be used. The nib 66 can be an extruded plastic tube with a single channel extending the length of the nib 66. The cross section of the channel can be in the shape of a snow flake. Such nibs can be obtained from a variety of sources including Teibow, Ltd. (Japan) and AuBEX Corp. (Japan). Suitable nibs may include Teibow model numbers PN-C, PN1-D, PH-C, PH1-D, PH5-D, PH5, PN1-D, PH2-D, PO, and PH. They can be made from a homopolymer or a copolymer, and more specifically, a polyacetal homopolymer or a polyacetal copolymer. A nib porosity of greater than about 15% has been found to be effective. A nib porosity of greater than about 25% is preferred. Additional suitable extruded nibs manufactured by the AuBEX Corp. may include DH/DB, F type, FX type, HA type, IL type, IX type, JA type, JC/JD type, JH type, JQ type, MA type, MC./MD type, MO type, NZ, PA-X series, PA type, PB type, PD A type, PD type, PF/SK type, PL/PU type, PS type, PW type, PY type, SA type, k VA type, VE type, and VS type. Alternatively, the valve could be used in combination with fibrous nibs comprising nylon, acrylic, or polyester fibers.

The metal nib adapter 68 is disposed on the nib 66 near the writing tip 38. The nib tube 70 is connected to the metal nib adapter 68. The nib tube 70 surrounds the nib 66 and extends from the nib adapter 68 near the writing tip 38 to inside the hole 74 in the reservoir holder 54. The nib tube 70 can be made of metal and provides strength to the nib 66 such that it does not buckle when a user applies pressure on the writing tip 38. The nib tube 70 further seals the ink within the nib 66 between the reservoir 56 and the nib adapter 68.

Figure 8:
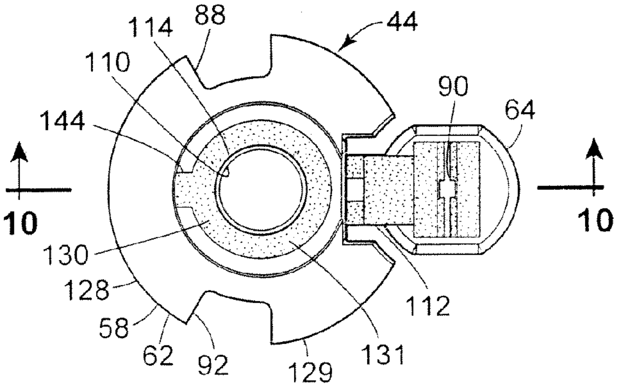
FIG. 8 is a bottom view of the valve of FIG. 5.
Figure 9:
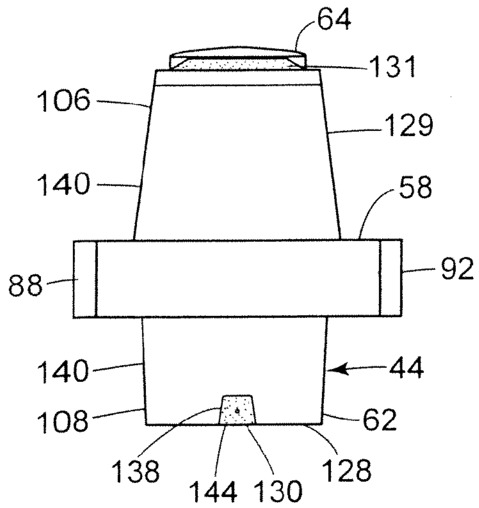
FIG. 9 is a front side view of the valve of FIG. 5.

The collar 50 is disposed on the reservoir holder 54, and the spring 48 is disposed about the nib tube 70 between the collar 50 and the valve 44 such that the spring 48 biases the collar 50 away from the valve 44. The string 52 is at ached to the collar 50 on both its first end 76 and its second end 78. The string 52 can be attached to the collar 50 in any known way, and in this example, the collar 50 includes a first slot 80 and a second slot 82, and the string 52 includes a first knot 84 on the first end 76, and a second knot 86 on the second end 78 wherein the knots 84, 86 each have a diameter that is larger than the width of the slots 80, 82. Thus, when each end 76, 78 of the string 52 is placed in the slots 80, 82, the knots 84, 86 maintain the string in the slots 80, 82. From the first end 76, the string 52 extends toward and through a first string guide 88 on the valve 44, around the door 64 and through a string holder 90 in the door 64, back through a second string guide 92 on the valve 44, and through the second slot 82 on the collar 50 (string guides and string holder are not shown in FIGS. 3 and 4, but are seen best in FIGS. 5 and 8). Under the biasing force of the spring 48, which pushes the collar 50 toward the actuation end 24, the string 52 tightly holds the door 64 against the valve body 62 to create a substantially air tight seal.

The reservoir holder 54 is a concentric tubular member extending back about the circumference of the reservoir 56 toward the actuation end 24 that has an open rear end 94 through which, during manufacture of the marker 20, the reservoir 56 is inserted. A plug 96 is disposed in the open rear end 94 of the reservoir holder 54 to seal the reservoir 56 within the reservoir holder 54. A spring 98 can be disposed between the plug 96 and the reservoir 56 to bias the reservoir 56 to the forward end of the reservoir holder 54 to ensure the greatest amount of contact between the nib 66 and the reservoir 56.

The plug 96 includes a shaft 100 extending toward the actuation end 24, and a plunger 102 is disposed on the shaft 100. A spring 104 is disposed between the plunger 102 and the actuator 28. The plug 96, plunger 102, spring 104, and actuator 28, when coupled as shown in FIG. 3, provide a well-known knock-type writing utensil actuation system. As is known, by repeatably pressing the actuator 28, the actuating system alternatingly places the nib 66 in the retracted position and the writing position shown in FIGS. 3 and 4. While a 'knock-type' actuator is shown herein, other types of actuator systems can be employed. For example, a side button actuation system as shown in U.S. Patent Publication No. 2006-0216103 A1, the disclosure of which is incorporated by reference, can also be used. In this example, the actuator 28 of this disclosure has been replaced with a side actuator extending through a slot in the side wall of the body of the writing utensil. In another example, a twist-type actuator can be used. In this well-known example, the user twists the rear holder 32 relative to the front holder 30 to actuate the nib 66. See, e.g., U.S. Pat. No. 4,221,490, the disclosure of which is herein incorporated by reference.

In the writing position shown in FIG. 4, a user has activated the actuation system to push the reservoir holder 54 toward the writing end 22 of the marker 20. The reservoir holder 54 pushes the collar 50 forward such that the string 52 is no longer under tension and goes slack. The slackness in the string 52 allows the door 64 on the valve 44 to open. In one embodiment, the nib 66 pushes the door 64 open and extends through the opening 36 in the front holder 30. In another more preferred embodiment, the door 64 is biased to the open position, and therefore when the tension on the string 52 goes slack, the door 64 automatically opens such that the nib 66 does not need to push the door 64 to open, or even touch the door 64 at all.

In a third embodiment, the string 52 itself pushes the door 64 open when the marker 20 is actuated, and the nib 66 does not touch the door 64. In one non-limiting example, a fluorocarbon monofilament string with a diameter of between about 0.20 mm and about 0.35 mm, about 0.22 mm and about 0.32 mm or about 0.25 mm, e.g., 0.27 mm, has sufficient rigidity to push the valve door 64 open. Other combinations of material and diameter can be used in any of the foregoing embodiments. In a further embodiment, the string 52 can be replaced with a cam mechanism to open and close the valve door 64.

While a single embodiment of marker 20 is generally shown herein, the marker 20 can generally be constructed in any of the constructions shown in Hashimoto, U.S. Pat. No.

5,048,990, the description of which is incorporated by reference. In other words, the valve 44, as detailed below, can be incorporated into any of the marker embodiments shown in the '990 patent with only minor modifications as would be seen by one of skill in the art. Accordingly, the valve 44 can be used in combination with larger fibrous nibs in addition to the extruded plastic nib 66 exemplified herein. Additionally, the valve can be used in combination with otherwise conventional ball point pens.

Referring now to FIGS. 5-12, the valve 44 is shown in detail. The valve 44 includes a front end 106, a rear end 108, and an inner surface 110 extending from the front end 106 to the rear end 108. As mentioned above, the valve 44 includes the door 64 pivotably connected to the valve body 62 at a hinge 112 at the front end 106. The valve body 62 includes an opening 114, wherein the door 64 is shiftable from an opened position show in FIG. 5 (corresponding to the writing position of the marker 20) where the door 64 is pivoted away from the opening 114, to a closed position in which the door 64 bears against the valve body 62 (corresponding to the retracted position of the marker 20) to close the opening 114 so as to provide a substantially air-tight seal. The valve 44 further includes the outwardly extending flange 58, which is used to mount the valve 44 within the forward holder 30, as discussed earlier. The valve body 62 includes string reliefs 116, 118, the flange 58 includes the string guides 88, 92, and the door 64 includes the string holder 90. The string 52 is disposed within the string holder 90, the string reliefs 116, 118, and the string guides 88, 92, when the string 52 is holding the door 64 against the valve body 62 (i.e., when the marker 20 is in the retracted position).

Figure 5:
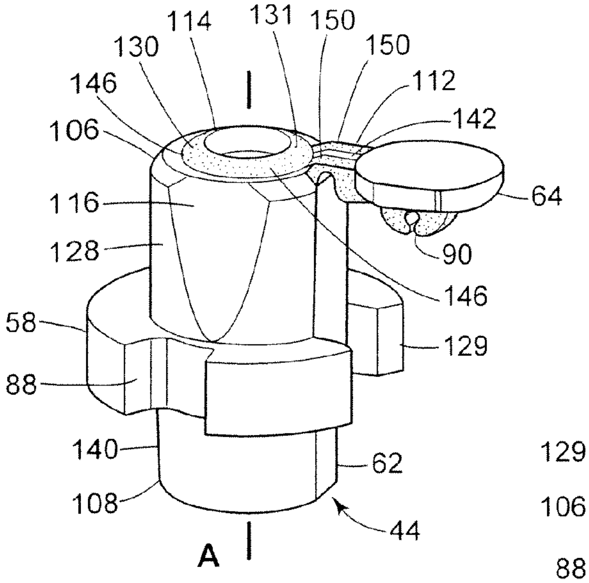
FIG. 5 is a perspective view of a valve in accordance with the present disclosure.
Figure 6:
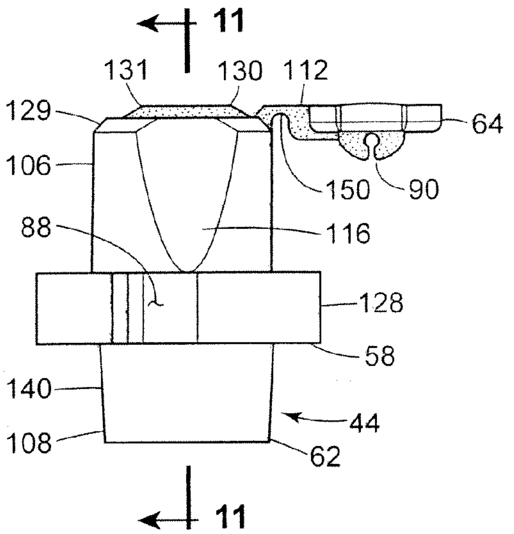
FIG. 6 is a right side view of the valve of FIG. 5.
Figure 7:
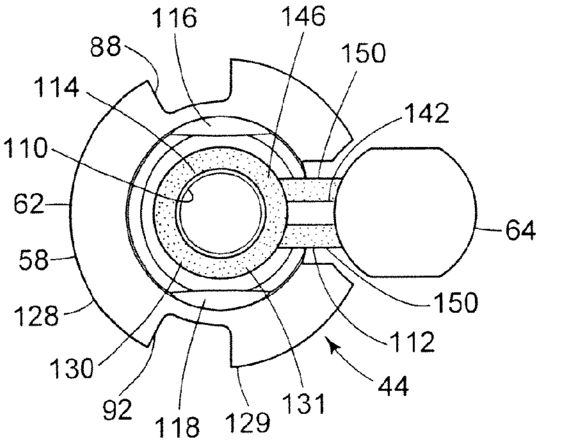
FIG. 7 is a top view of the valve of FIG. 5.

As can best be seen in FIGS. 5 and 7, the string reliefs 116, 118 are planar and are formed at an angle relative to a central axis A of the valve 44. The angled string reliefs allow the thickness of the alls of the valve body 62 to be substantially maintained, and therefore minimize solvent vapor permeability. Further, the thickness of the valve body 62 protects against deformation of the valve body 62 into an oval shape (e.g., when subject to loading by the spring 48 and the string 52). The string reliefs 116, 118 also allow the force of the string 52 to more efficiently close the valve door 64. The hinge 112 should be thick enough such that the valve door 64 can repeatably close against the valve body 62. Likewise, the hinge 112 should not be so thick that it is too stiff to open and close, thereby causing the writing tip 38 to contact the valve door 64. In one non-limiting example, it has been found that the hinge 112 can have a radius (see reference numeral 150, FIG. 6) of about 0.15 mm to about 0.30 mm, about 0.20 mm to about 0.28 mm, or about 0.25 mm and a thickness of about 0.10 mm to about 0.30 mm, 0.15 mm to about 0.25 mm, or about 0.20 mm. These dimensions form a design that requires minimal force to open the valve door 64 (and the string 52 itself can push the valve door 64 open as previously described) while still providing a repeatable closure. Finally, the string guides 88, 92 are formed of a large size such that they are effective at preventing the string 52 front gathering and buckling during actuation and retraction of the marker 20. Because the string 52 does not buckle as quickly, it pushes against the door 64 early in the actuation cycle, and therefore opens the door 64 prior to the nib 66 contacting the door 64. In the disclosed example, the string guides 88, 92 are each approximately 1/12 of the total circumference of the flange 58, or about 30° of the circular radius of the flange 58.

Figure 10:
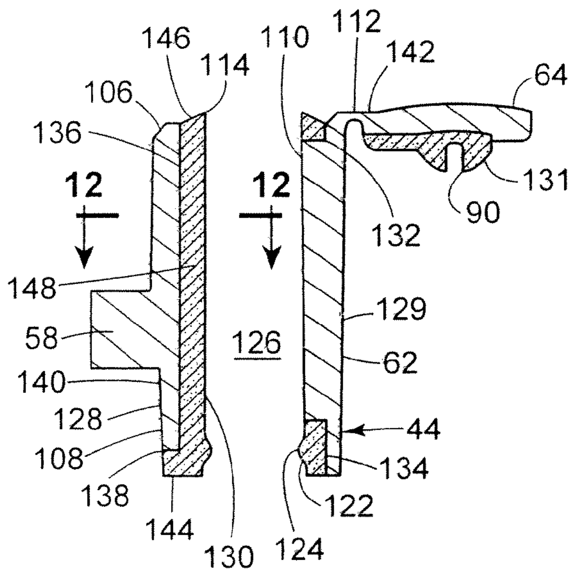
FIG. 10 is a cross-sectional view taken along the line 10-10 of FIG. 8.
Figure 11:
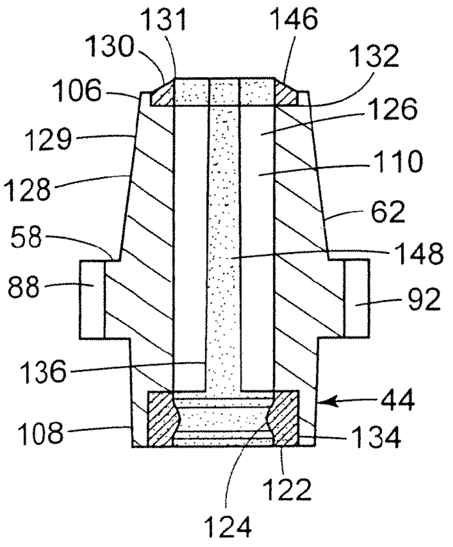
FIG. 11 is a cross-sectional view taken along the line 11-11 of FIG. 6.
Figure 12:
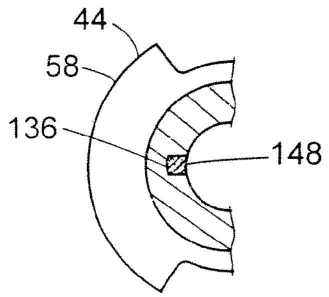
FIG. 12 is a cross-sectional view taken along the line 12-12 of FIG. 10.

As best seen in FIGS. 10 and 11, the valve 44 includes an inner seal 122 disposed at the rear end 108 of the valve body 62. The inner seal 122 includes a circumferential ridge 124 extending inwardly about the inner surface 110 of the valve 44. The inner seal 122 bears against the nib tube 70 to seal the rear end 108 of the valve body 62. Accordingly, a sealed internal chamber 126 is formed within the door 64, the inner seal 122, and the inner surface 110 of the valve 44.

The valve 44 is made from a first material 128, generally shown as white in FIGS. 5-12, and a second material 130, shown as stippled in FIGS. 5-12. The first material 128 forms a first portion 129 of the valve 44, and the second material 130 forms a second portion 131 of the valve 44. The first portion 129 includes the body 62, a circumferential seat 132 in the front end 106 of the valve body 62, a circumferential recess 134 in the rear end 108 of the valve body 62, and may further include a channel 136 connecting the circumferential seat 132 to the circumferential recess 134. The channel 136 can be seen best in FIGS. 10-12 as a linear recess in the first portion 129. A gate 138 is disposed in the rear end 108 and is essentially a hole in the side of the first portion 129 connecting the circumferential recess 134 to an outer surface 140 of the valve body 62. The first portion 129 includes the flange 58 and a slender inner hinge 142 that connects the valve body 62 to the door 64. As shown, each of these components is made from the first material 128.

The second portion 131 of the valve 44 includes the inner seal 122 and the circumferential ridge 124 disposed in the circumferential recess 134 of the first portion 129. The second portion 131 further generally includes a plug 144 disposed in the gate 138, a door seal 146 disposed within the circumferential seat 132, and a runner 148 disposed within the channel 136 and connecting the door seal 146 and the inner seal 122. Finally, the second portion 131 may further include the string holder 90 of the door 64 and a pair of outer hinges 150 connecting the string holder 90 to the door seal 146 and disposed on either side of the inner hinge 142. As exemplified herein, all of the components of the second portion 131 are made of the second material 130. As explained in further detail below, however, the material construction of these components may be varied in accordance with the teachings of the present disclosure.

The valve 44 can be manufactured in a two-step injection molding process, also known as two-shot molding. In a first step, the first material 128 can be injection-molded to form the components of the first portion 129 of the valve 44. The first material 128 can be injected such that it forms the flange 58 first, then the valve body 62, then flows through the inner hinge 142 and forms the door 64. This sequence of the flow of the first material 128 during injection is but one example, and other sequences could also be used. In a second step, the second material 130 can be injection molded onto the first material 128 to form the second portion 131 of the valve 44. The second material 130 can enter through the gate 138, flow into the circumferential recess 134, and form the inner seal 122. The second material 130 can then flow through the channel 136 of the first portion 129 to form the runner 148, and then into the circumferential seat 132 to form the door seal 146. The second material 130 can then flow over the inner hinge 142 of the first material 128 to form the outer hinges 150 and onto the door 64 to form the string holder 90. Again, this sequence of the flow of the second material 130 during injection is but one example, and other sequences could be used. The combination of two materials allows advantageous properties of each material to be used in the valve 44 and, more specifically, in the valve body 62 and door 64.

It has been found that the first material 128 can be a relatively hard thermoplastic material such as polypropylene (PP), and the second material 130 can be a thermoplastic elastomer (TPE). Because both PP and TPE can take many chemical formulations, the two ultimately selected materials should be chemically compatible such that they are able to be molded into a single part on a single molding press. The first material 128 should provide moldability, vapor barrier properties, and low cost. The second material 130 should have compatibility with the first material 128 to ensure a good bond between the two during the molding process, high lubricity to minimize dynamic friction, and a durometer in the range of about 60 A-100 A, preferably 70 A-90 A, or more preferably about 80 A to provide structural stability while being soft enough to provide effective seals. Both materials should have melt flow rates and other properties to allow molding through a living hinge. Other thermoplastic materials may also be used for the first material 129, including polyethylene, HDPE, Nylon, PVC, etc., provided that they satisfy the necessary moldability, vapor barrier properties, and cost considerations. A variety of TPE's can be used for the second material 131, provided that they satisfy the necessary molding and sealing characteristics. Useful PP's may include Model No. P4C6Z-022 and Model No. P4C6B-024B, both made by Huntsman International (Woodlands, Tex.), Model No. HM35Z2 made by Arco Chemical Company (Newtown Square, Pa.), and Marlex HLN-350 made by Phillips Sumika Polypropylene Company (Woodlands, Tex.). Useful TPE's may include Santoprene 101-73, Santoprene 101-80, Santoprene 101-87, Santoprene 8201-70, Santoprene 8201-80, Santoprene 8201-90, and Santoprene 8211-75, made by Advanced Elastomer Systems, L.P. (Akron, Ohio), Dynaflex G2780-0001, Dynaflex G7980-1001-00, Model No. LC290-105, Model No. LC293-116, and Model No. LC248-045, made by GLS Corp. (McHenry, Ill.), KU2-865 and KU2-8770, made by Bayer Material Science (Pittsburgh, Pa.), Estagrip ST70A and ST80A, made by Noveon, Inc. (Cleveland, Ohio), and Monprene MP-2890M, Monprene MP-2870, Monprene MP-2228, Monprene MP-1885-J, and Monprene MP-2780, made by Teknor Apex Company (Pawtucket, R.I.).

In other embodiments not shown, the hinge 112 can be made from a single material (either the first material 128 or the second material 130), or the outer hinge 150 could be PP (or another suitable first material 128), while the inner hinge 142 could be TPE (or another suitable second material 130). Also, the runner 148 can be placed at different locations on the inner surface 110 of the valve 44, or could be placed on the outer surface 140 of the valve 44, or even multiple runners 148 could be used. If no runner 148 is used, then the inner seal 122 would be separated from the door seal 146, and two injection gates would be required. Further, the valve 44 could be made by injecting the second material 130 at multiple locations. In this case, the channel 136 and the runner 148 may not be necessary, and a second gate similar to the gate 138 would be disposed on the front end 106 on the valve body 62. The string holder 90 could be made of PP, and the door seal 146 could be disposed on the door 64 instead of the valve body 62. As an alternative to the two-shot injection molding process, the valve 44 could be constructed of separate pieces and then assembled. For example, the inner seal 122 could adhere to or otherwise couple to the circumferential recess 134 and the door seal 146 can be similarly coupled to the circumferential seat 132.

Furthermore, the embodiment disclosed herein depicts the valve 44 in use with a marker 20. Those of skill in the art will see that the disclosed valve 44 can be used in other writing utensils, such as ball point pens. Further, the disclosed valve 44 may prove useful in correction fluid dispensers, paint applicators, and other products completely outside of the writing implement field.

Numerous additional modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

We claim:

1. A valve, comprising:

a first valve portion made from a first material, the first valve portion including a body, a door, and an inner hinge pivotably connecting the body to the door, the body including a first opening at a first end and a second opening at a second end opposite the first end, wherein the inner hinge pivotably connects the door to the body at the first end; and a second valve portion made from a second material, the second valve portion including a door seal disposed circumferentially around the first opening and an outer hinge disposed about the inner hinge, wherein the door bears against the door seal to cover the opening and to form a substantially air-tight seal between the door and the door seal when the door is in a closed position.

2. The valve of claim 1, the second valve portion further comprising a string holder disposed on the door, the string holder being connected to the door seal by the outer hinge.

3. The valve of claim 1, wherein the first material is a thermoplastic material.

4. The valve of claim 3, wherein the thermoplastic material is selected from polypropylene, polyethylene, high density polyethylene, nylon, polyvinyl chloride and mixtures thereof.

5. The valve claim 3, wherein the second material is a thermoplastic elastomer.

6. A valve comprising:

a first valve portion made from a first material, the first valve portion including a body, a door, and an inner hinge pivotably connecting the body to the door, the body including a first opening at a first end and a second opening at a second end opposite the first end, wherein the inner hinge pivotably connects the door to the body at the first end; and a second valve portion made from a second material, the second valve portion including a door seal disposed circumferentially around the first opening, wherein the door bears against the door seal to cover the opening and to form a substantially air-tight seal between the door and the door seal when the door is in a closed position, and wherein the first valve portion further comprises a channel disposed in an inner surface of the body and extending from the first end to the second end, and the second valve portion further comprises a runner disposed in the channel and extending from the door seal to an inner seal.

7. The valve of claim 6, the first valve portion including a gate extending from the runner to an outer surface of the body.

8. The valve of claim 7, the second valve portion including a plug disposed in the gate.

9. The valve of claim 7, further comprising a second gate disposed on the first end of the body.

10. The valve of claim 1, further comprising a circumferential seat disposed in the first opening.

11. The valve of claim, wherein the door seal is disposed within the circumferential seat.

12. The valve of claim 1, wherein the valve is formed in a two-shot injection molding process, the first valve portion being formed in a single first shot, and the second valve portion being formed in a single second shot.

13. The valve of claim 1, wherein the second material has a durometer in the range of between approximately 60 A and approximately 100 A.

14. The valve of claim 1, wherein the second material has a durometer in the range of between approximately 70 A and approximately 90 A.

15. The valve of claim 1, wherein the door seal is disposed on the door.

16. A retractable marker, comprising:

a barrel with an opening;

a valve disposed in the barrel and comprising a first valve portion made from a first material and a second valve portion made from a second material, the first valve portion including a body, a door, and an inner hinge pivotably connecting the body to the door, the body including a first opening at a first end and a second opening at a second end opposite the first end, wherein the inner hinge pivotably connects the door to the body at the first end, the second valve portion including a door seal disposed circumferentially around the first opening;

an ink reservoir disposed in the barrel; and a nib subassembly with a writing tip in fluid communication with the reservoir;

wherein the nib subassembly is slidable between a retracted position in which the writing tip is inside the valve such that the door bears on the door seal to form a substantially air-tight seal between the door and the door seal and a writing position where the writing tip is extended out of the opening of the barrel and the door is pivoted away from the door seal.

17. The marker of claim 16, the first valve portion further comprising a channel disposed in an inner surface of the body and extending from the first end to the second end, the second valve portion further comprising a runner disposed in the channel and extending from the second end to the first end.

18. The marker of claim 16, wherein the first material is a thermoplastic and the second material is a thermoplastic elastomer.

* * * * *